United States Patent [19]
Oliver et al.

[11] Patent Number: 6,111,709
[45] Date of Patent: Aug. 29, 2000

[54] DIGITAL RECORDER WITH SEAMLESS PUNCH-OUT

[75] Inventors: Richard J. Oliver, Laguna Beach; Roger M. Duvall, Garden Grove, both of Calif.

[73] Assignees: Sony Corporation, Tokyo, Japan; Sony Pictures Entertainment Inc., Culver City, Calif.

[21] Appl. No.: 08/936,337

[22] Filed: Sep. 24, 1997

[51] Int. Cl.$^7$ ................................................. G11B 15/18
[52] U.S. Cl. ...................................... 360/39; 369/124.06
[58] Field of Search .................................. 369/60, 124.06; 360/13

[56] References Cited

U.S. PATENT DOCUMENTS

| | | | |
|---|---|---|---|
| 4,982,390 | 1/1991 | Tanaka | 360/7 |
| 5,436,875 | 7/1995 | Shinada | 369/32 |
| 5,642,492 | 6/1997 | Iizuka | 360/39 |
| 5,661,706 | 8/1997 | Ohtomo | 369/54 |

FOREIGN PATENT DOCUMENTS

| | | |
|---|---|---|
| 0762756 A2 | 3/1997 | European Pat. Off. . |
| 0866446 A2 | 9/1998 | European Pat. Off. . |

OTHER PUBLICATIONS

EP 0 866446 A2 Toshiba, A disk apparatus having a single recording head and capable of simultaneous recording and reproducing, see fig. 1, p. 1, lines 3–5, and p. 2, lines 8–15.

PAJ abstract No. 10106117 CD Serial No. 9804 & JP 10106117 A (Ricoh), Disk Device, see abstract.

WPI abstract accession No. 97–070104 [Derwent week 07] & JP 08315500 A (Hitachi) Data recording and reproducing device for e.g. CD, CD–ROM, video CD, see abstract.

PAJ abstract No. 08255464 CD Serial No. 9610 & JP 08255464 A (Sony), Method and equipment for processing information, see abstract

*Primary Examiner*—Paul Loomis
*Assistant Examiner*—Regina Y. Neal
*Attorney, Agent, or Firm*—Blakely, Sokoloff, Taylor & Zafman LLP

[57] ABSTRACT

A system and method for playing and recording digital media such as digital audio. The system allows for seamless punch-out (exiting record mode) during a recording session by continuing to transfer playback data for a sequence from the mass storage to a buffer simultaneous with transferring record data for the sequence into the buffer and the mass storage. This allows the user to seamlessly switch between record mode and playback mode, presenting only a negligible (if any) delay between the time the user requests punch-out and the time the user experiences the correct original playback data. In a preferred embodiment, the invention is implemented as a digital audio playing and recording system providing seamless punch-out for multiple channels of digital audio using RAM buffers and rotating magnetic disk devices for storing the digital audio.

13 Claims, 4 Drawing Sheets

DIGITAL RECORDER WITH SEAMLESS PUNCH-OUT

BACKGROUND INFORMATION

This invention is generally related to digital recording systems, and more particularly, to digital audio playing and recording.

The fidelity provided by high resolution digitized forms of images and sounds, coupled with the ease of manipulating such digital data has resulted in the increasing popularity of systems for playing and recording digital media. In such systems, digital media is typically stored as a number of track sequences on a mass storage device. A computer system is configured to determine the location of original data in the mass storage, and may then record a sequence of video frames or a stream of audio by sequentially transferring the record data to replace the original data in the mass storage. Similarly, during playback, the computer system determines the location of playback data and then sequentially reads that data from the mass storage into an output device where the data may be experienced by the user.

Of course, the digital media must be converted back into analog form to be displayed or heard. In general, the sample period used in analog-to-digital and digital-to-analog conversion determines how fast the digital media becomes available for recording (using analog-to-digital conversion), and how fast the analog information becomes available for playback (using digital-to-analog conversion). As the times required for access (write and read) to mass storage devices such as rotating magnetic disks are considerably longer than the typical sample period, the mass storage lags during playback. Similarly, the mass storage may be overwhelmed with data during record. To alleviate these conditions, a buffer may be used to temporarily store the data while it is being transferred to and from the mass storage.

Despite the use of a buffer, there has been great difficulty in designing a digital playback and recording system that behaves as a conventional analog tape recorder and allows the user to seamlessly switch between record and playback of the original material. Digital systems typically exhibit a delay (that is noticeable by the user) in switching back to the original digital media during a recording or editing session. This problem is further explained in detail below.

A recording session typically begins with a track being played by the system. As the user is experiencing the media (video or audio), he or she may then wish to begin recording over the original media, experience the material being recorded (while recording), stop recording at a later point, and immediately continue experiencing what is on the original track when the recording is stopped. This is also sometimes referred to as punch-in (stop playback of the original track and begin record), and punch-out (stop record and resume playback of the original track beyond the stop record point). In performing punch-in/punch-out, the user will be switching between play, record, and then back to play, where the user expects, or at least would like to hear (if dealing with an audio system), at the output device, a smooth and relatively unnoticeable transition between the recorded material and the material on the original track following the punch-out point.

Two known techniques are used in digital media recording systems to implement punch-in/punch-out. A first technique is the manual punch. In this case, the recording system does not know when punch-out, i.e., stop recording and begin playback, will occur. The user is allowed to determine the punch-out time at any moment.

The manual punch-out technique, however, presents a noticeable delay in most recording systems between the time at which the user decides to stop recording and the time at which the correct playback data arrives at the output device and is experienced by the user. This delay is due to the time required to locate the original data in the mass storage device at the punch-out point, and becomes more pronounced when a large number of channels of data are involved. For example, it has been observed that for sixteen digital audio channels, the synchronization of the sixteen channels will present a delay of one-half to two-thirds of a second between the time the user requests punch-out and the point at which the playback data arrives at the speaker.

Another solution to the punch-out delay attempts to predefine the punch-in and punch-out points of the sequence, before the recording session has started. In this way, the recording system knows the duration of the record portion, and can therefore determine where in the mass storage the correct playback data begins and thus "prefetch" the correct playback data into the buffer, in time for switching from record to playback at the predetermined punch-out point. However, such an implementation does not allow the user to alter the punch-out time once actual recording begins and still maintain a seamless transition between what is being recorded and the correct original playback data that follows the punch-out point.

Therefore, in view of the foregoing, there is a need for a seamless punch-out technique which also allows the user to punch-out at any moment during the record session, similar to the standard analog tape recorder model.

SUMMARY

The invention is directed at a system for recording digital media having a mass storage and a buffer, where the mass storage contains at least one sequence of digital media. The buffer is for temporary storage of record and playback data related to the sequence. In operation, the system is configured such that the buffer continues to receive playback data from the mass storage after punch-in, simultaneous with providing the mass storage with new record data. In this way, the buffer will contain the correct playback data at punch-out, thus providing a seamless transition to the playback data in the original sequence that follows the punch-out point.

As a method of playing and recording digital media, the invention includes the steps of playing the digital media sequence by transferring the original data of the sequence from the mass storage to an output device, entering record mode (punch-in) by transferring new record data for the sequence to the mass storage element while simultaneously continuing to transfer the original data, and then exiting record mode (punch-out) by halting the transfer of the record data but continuing to transfer the original data. By continuing to transfer the original data to the buffer while new data is being recorded, the invention allows a seamless punch-out at any time during recording, because the correct original data of the sequence will already be in the buffer at punch-out and can therefore be sent to an output device with negligible delay as far as the user is concerned.

BRIEF DESCRIPTION OF THE DRAWINGS

These and other features as well as advantages of the different embodiments of the invention will be apparent by referring to the drawings, detailed description and claims below, where:

DETAILED DESCRIPTION

Figure 1:
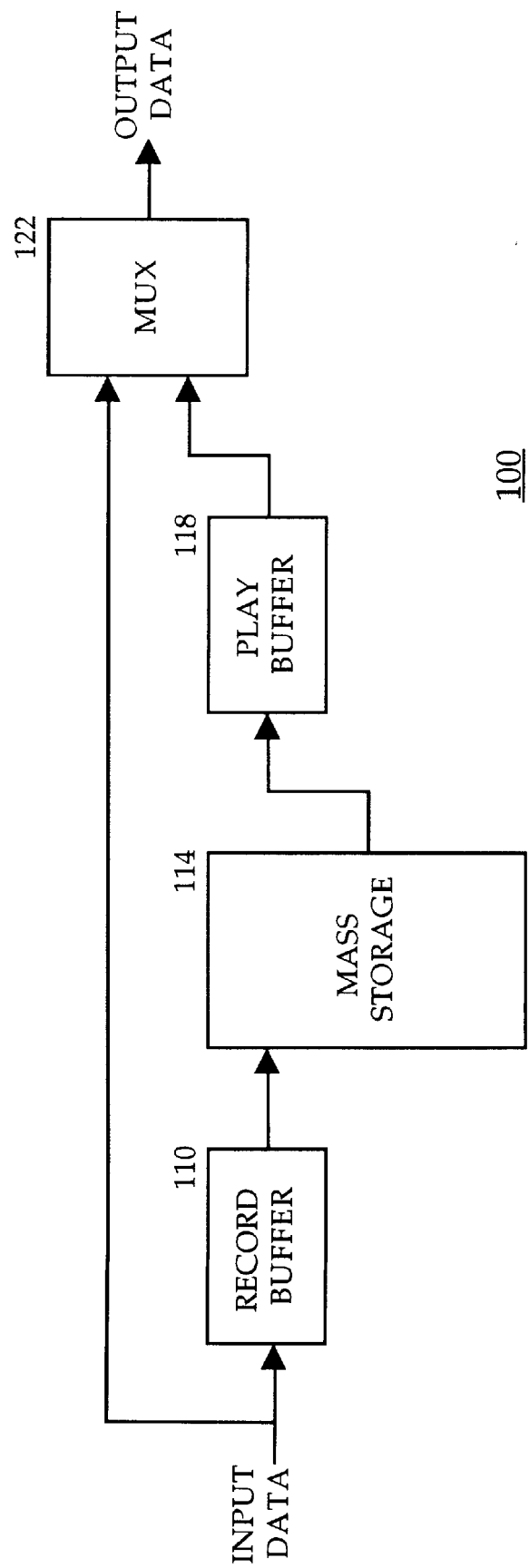
FIG. 1 illustrates a data flow diagram for an embodiment of the invention.

As summarized above, the invention provides a method and system for playing and recording digital media that allows for seamless punch-out at any time during the recording session as desired by the user. FIG. 1 illustrates a basic data flow diagram of an embodiment of the invention as a system 100 for playing and recording digital media. The system 100 is centered around a mass storage 114 that contains the sequences of digital media to be played and edited.

In most applications of the system 100, including audio and video, the rate at which input data and output data enters and leaves the system is much higher than the rate at which the data can be written to or read from the mass storage. For example, a sampling period for audio may be 23 microseconds whereas the read and write cycle times for a modern mass storage device such as a rotating magnetic disk may be eight milliseconds. This disparity between the data rates results in a requirement of using a buffer to hide the disparity.

Each of the record buffer 110 and the play buffer 118 may be implemented by semiconductor memory devices, including random access memory (RAM) or any other memory which is capable of receiving (record buffer) and providing (play buffer) the digital media at the rate required by the input and output interfaces (not shown). As in FIG. 1, the embodiment of the invention features separate record and play buffers. However, these two buffers may be allocated as part of a single buffer IC or group of ICs.

FIG. 1 illustrates the input data being received by the record buffer 110 before being provided to the mass storage 114. Similarly, the playback data existing in the mass storage 114 is provided to the play buffer 118 which in turn is fed to the output. The invention is characterized in that when the system 100 enters a record mode following play mode, the system 100 continues to transfer the playback data (related to the one or more sequences of digital media in the mass storage) to the play buffer. Thus, when the user elects to punch-in (or enter the record mode), the original transfer from the mass storage 114 to the buffer 118 is not halted. In addition, when the user enters the record mode, a stream of input data begins to enter the record buffer 110 and may be simultaneously stored in the mass storage 114. This simultaneous reading from and writing to the mass storage 114 requires increased data bandwidth from the mass storage as compared to the above-described prior art techniques of either playing or recording (but not both simultaneously).

Completing the system in FIG. 1 is a multiplexer 122 used in selecting either the input (record) data or the playback data, to be provided as an output of the system. The multiplexer 122 is directly coupled to an input interface (not shown) for receiving the digital record data into the system 100. Alternatively, the multiplexer may receive the record data from the record buffer 110 rather than directly from the input interface. The playback data is received from the buffer (in particular, the playback buffer 118).

The system may also be configured to provide both the playback data simultaneous with the record data as an output, so that the user may, for example, listen to the playback data and the record data simultaneously.

Figure 2:
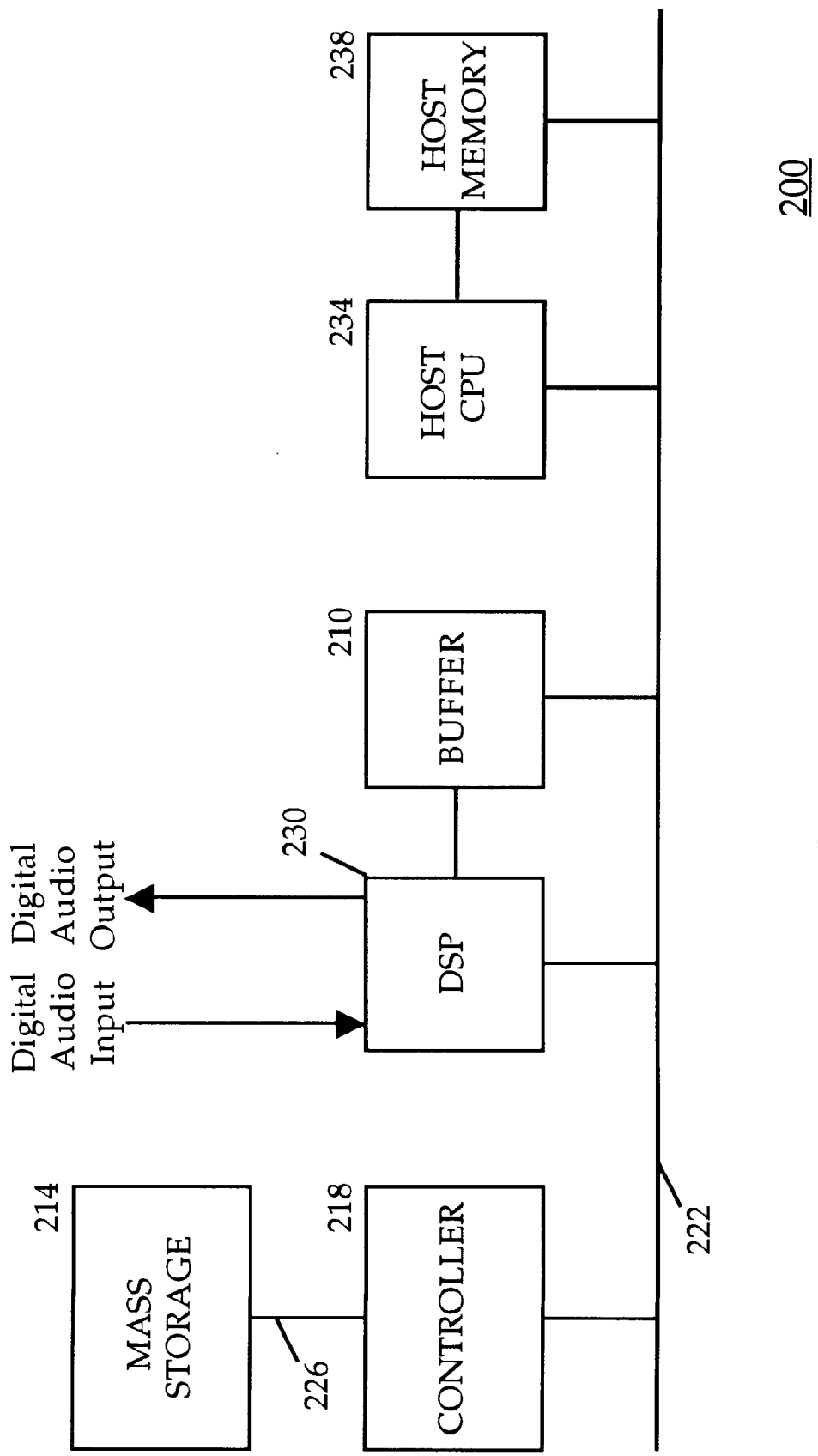
FIG. 2 is a block diagram of a playing and recording system according to another embodiment of the invention.

Having described an embodiment of the invention as the data flow diagram in FIG. 1, FIG. 2 illustrates a more particular embodiment of the invention as a modern data processing or computer system 200. The system 200 in FIG. 2 uses a general purpose computer bus 222, such as the Peripheral Components Interconnect (PCI) bus, to couple a number of key hardware components. First is the mass storage 214, which may require a controller 218 that interfaces with the bus 222. As suggested earlier, the mass storage 214 may include a number of rotating magnetic disk devices that may interface the controller 218, for example, through the commonly used Small Computer System Interface (SCSI).

The digital media arrives at and departs from the system 200 through a digital signal processing (DSP) unit 230 that is also coupled to the bus 222. The DSP unit 230 may contain standard DSP integrated circuits as well as specialized and custom hardware and software, and performs compute-intensive operations on the digital media such as mixing, gain calculations, filtering, cross fades, etc.

A buffer 210 may be implemented as a RAM or other memory that allows simultaneous reading and writing of data at a sufficiently high rate given the sample period used for obtaining and converting the digital media. Preferably, there is a direct interface between the DSP unit 230 and the buffer 210 in order to keep a high rate of transfer to and from the buffer 210. The buffer 210 also has a direct interface to the bus 222 so as to be communicatively coupled to the mass storage 214 and the host central processing unit (CPU) 234.

The host CPU 234 may be used for keeping track of the overall operation of the playing and recording system 200 and for conducting playback and record processes. The host CPU 234 has direct control over the elements of the system, including the mass storage 214 (and controller 218), the DSP unit 230, and the buffer 210. The software used by the host CPU 234 is stored in the host memory 238.

In order to optimize operation by reducing the required bandwidth of the system 200 in FIG. 2, the system may be configured so that the peak memory (in the mass storage 214 and buffer 210) requirements of the system occur at different times for the recording process than for the playing process. For example, when a single pool of buffer space is used from which the storage space for the play and record buffers is allocated, the pool becomes smaller than the sum of the peak requirements for the individual record and play processes, but remains adequate for the combined process. The total amount of buffer space used at any given time may be viewed as the sum of the instantaneous usage by the record process and the instantaneous usage by the play process. When the combined process is configured so the peak instantaneous record usage does not occur at the same time as the peak instantaneous play usage, the total instantaneous usage is always either the sum of a peak and non-peak individual process, or the sum of two non-peak individual process usages. In both cases, the total instantaneous usage is always less than the sum of the peak usages for both processes.

Another optimization that may be performed in order to help control the increase in bandwidth and storage space requirements for the invention is to schedule the reading from and writing to the mass storage in a way which optimizes the efficiency of access to the mass storage 214. Greater data throughput by the mass storage 214, as a rotating magnetic disk device, may be obtained by accumulating a set of I/O operations (combined read (play) and write (record) transfers from and to the mass storage 214) on the bus 222, and sorting them in an order that minimizes the seek distance in the disk device between each transfer. In this optimization, disk access requests from an application program running on the host CPU 234 to the controller 218 may be blocked until a relatively large set of read/write requests are collected. An optimizing scheduler then sorts the order of the requests, so that the order of the set of read/write requests corresponds to the physical distribution of sectors on a disk which are to be accessed by each read/write request. The ordered set of read/write requests are then transmitted to the controller 218. For example, a disk I/O queue of read/write requests may be blocked from being processed for a fixed period of time while the read/write requests accumulate. The optimizing scheduler then optimizes the entire queue in a single pass and sends the operations to the controller in the optimized order. Also, by increasing the size of the queue, new requests inserted into the queue may have a greater chance of being optimally placed between requests already in the queue, thus improving the average seek time for the set of requests.

The above-described embodiments of the invention in FIGS. 1 and 2 were described with respect to sequences of generalized digital media stored in the mass storage. In a preferred embodiment, the sequences of digital media are tracks of digital audio, where each track corresponds to a channel of digital audio.

The digital audio embodiment may be used in conjunction with motion picture systems, and may include six or more channels of digital audio. Of course, as the number of channels increases, the amount of digital media to be processed also increases, thereby increasing the bandwidth and storage requirements of the play and record system of the invention. In that case, the above mentioned optimizations may be particularly helpful in reducing overall system cost by reducing the needed bandwidth and storage space in the buffer 210 and in the mass storage 214.

Figure 3:
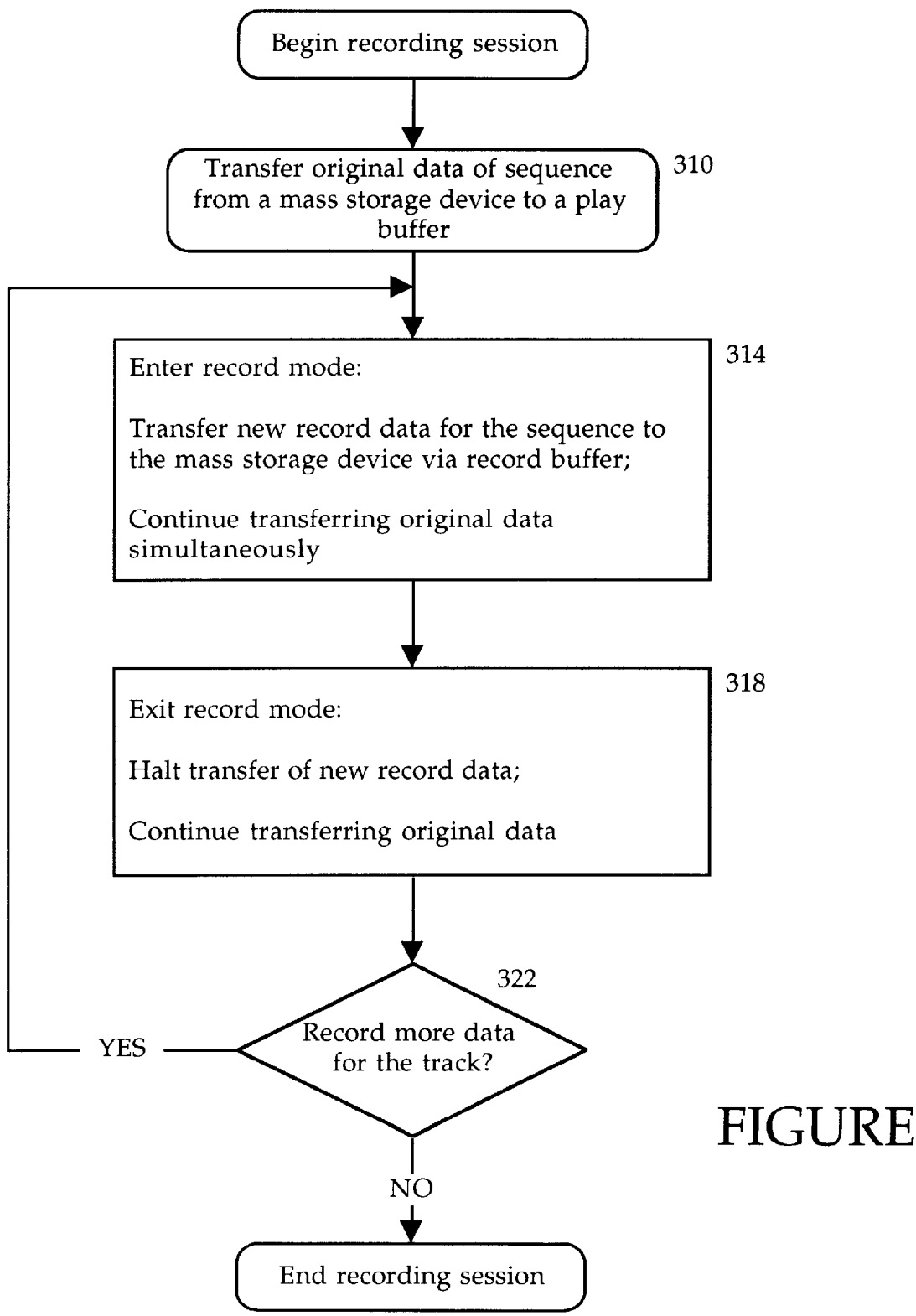
FIG. 3 illustrates a flow diagram of the steps performed by a playing and recording system according to another embodiment of the invention.

Another embodiment of the invention as a method of playing and recording digital media is illustrated in FIG. 3, in conjunction with the data flow diagram of FIG. 1 and the system embodiment of FIG. 2. The description in FIG. 3 assumes the existence of a sequence of digital media, already present in the mass storage 214, which the user of the record/play system wishes to edit in some way. The recording session begins in step 310 when the system begins to play the original data of the sequence by transferring the data sequentially from the mass storage 214 to the play buffer 118. Of course, this data may then be transferred to an output device (such as a speaker) in order to be further experienced by the user.

As the original sequence is being played, the user may decide at any time that the system enter record mode, as in step 314, to edit a portion of the original sequence by adding new record data. This new record data may be "recorded" by actually replacing (in the mass storage) the portion of the original data to be edited. However, as described below with the preferred technique, the record data does not literally over write the portion to be edited, but is rather referred to (using a pointer system) as the new data for the edited portion of the original sequence.

After the system has been placed in record mode, the play/record system continues to transfer original data from the portion to be edited to the buffer, simultaneous with the new data for the same portion being accepted by the buffer. The system should be configured such that when the user requests punch-out to exit record mode, the buffer will contain the portion of the original sequence that follows the punch-out point. In this way, the original playback data may be immediately sent, with negligible delay, to the output device, thereby allowing seamless switching between record and playback just as in a standard analog tape recorder.

Punch-out is described in step 318, where the system may exit record mode at any time during the recording session by halting the arrival of new record data into the buffer. In response to the punch-out request, the system may begin to transfer original data from the sequence, namely the data that immediately follows the edited portion and that is already in the playback buffer, to the output device.

The above punch-in and punch-out steps may be repeated after decision block 322 to record additional portions of the sequence as desired by the user, or alternatively, the user may end the recording session after the single punch-in/punch-out cycle.

Figure 4:
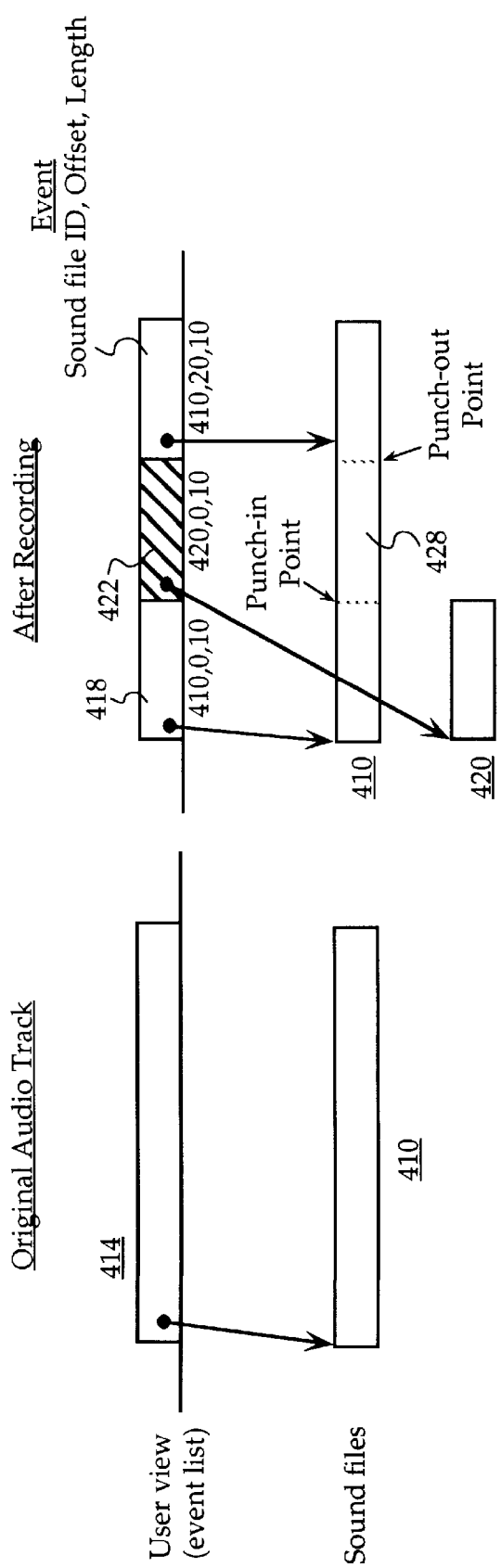
FIG. 4 shows punch-in and punch-out on an audio track according to another embodiment of the invention.

FIG. 4 illustrates certain operations that are performed in a further embodiment of the invention in which the digital media includes at least one audio track. This preferred embodiment contemplates using non-linear editing techniques for the manipulation of pointers to sound files 410 and 420 stored in the mass storage 214. The sound files may be in the conventional .wav format which contains a sequence of digital audio data. Using this technique, each audio track becomes a list of events 414, where each event 418 identifies a portion of audio data having a given duration. The event includes a sound file identification, an offset which identifies the relative starting position of the data in the sound file, and a length which specifies the duration of the audio data.

Thus, in FIG. 4, the original audio track may be viewed as an event list 414 that begins with an event that points to a sound file 410. When the user requests to enter record mode for the original audio track, the system continues to transfer playback data in the portion 428 of the sound file 410, and inserts a new event 422, into the event list 414. The new event 422 may point to a sound file 420 having the record data that will "replace" the portion 428. After the user requests punch-out, the system determines the length of the recorded region (and the portion 428) and enters this length in the new event 422.

The above example also allows non-destructive editing, where all original sound files are kept untouched, including the original sound file 410 and the record data in sound file 420. This technique allows the user to undo edits, including recordings, by simply a manipulation of the event list 414, at the expense of using more mass storage space than is represented to the user.

Although the above example uses existing sound file 420 for the record data, the record data may also be obtained in real-time using, for example, a microphone connected to an analog-to-digital conversion system that is coupled to the input of the record/play system.

To summarize, the embodiments of the invention described above present a digital media recording/playing system and method having a seamless punch-out during a recording session. By continuously playing the portion being edited, while simultaneously recording over that portion, the invention provides better user responsiveness by a seamless punch-out, and also provides the user with the additional feature of simultaneously listening to the playback data and the record data. The embodiments described above are, however, provided merely to illustrate the principles of the invention and should not be construed as limiting the scope of the invention. Rather, the principles of the invention may be applied to a range of systems to achieve the advantages described herein and to achieve other advantages or satisfy other objectives as well.

In addition, for the sake of brevity, not all of the possible embodiments of the invention have been described. For example, there may be computer system architectures other than the one illustrated in FIG. 2 which may be configured (using hardware and software) to implement the steps recited in FIG. 3. Also, there may be different techniques for implementing the simultaneous mass storage reading and writing processes. Therefore, the scope of the invention should be determined not by the embodiments illustrated but by the appended claims and their legal equivalents.

What is claimed is:

1. A system for recording digital media, comprising:

mass storage containing at least one sequence of digital media; and a buffer coupled to the mass storage for temporary storage of record data and playback data related to the sequence, the buffer being configured to provide the mass storage with the record data and receive from the mass storage the playback data; and control means for causing the record data to be transferred from the buffer to the mass storage responsive to a command to enter record mode, without halting and without substantially changing the rate of a simultaneous transfer of the playback data out of the buffer, while continuing to transfer playback data from the mass storage into the buffer, so that upon receipt of a command to exit record mode, a next portion of playback data in the sequence of digital media to be transferred out of the buffer is that which would have been transferred out of the buffer had the command to enter record mode not been received.

2. A system as in claim 1 further comprising multiplexer means having a first input coupled to said buffer to receive the playback data and a second input coupled to receive the record data, and configured to provide output data as one of the cord data and the playback data; and multiplexer control means for automatically and immediately selecting the playback data as the output data responsive to a command to exit record mode, so that the output data switches between the record data and the playback data immediately upon exiting record mode.

3. A system as in claim 2 further comprising an input interface for receiving the record data into the system, and wherein the multiplexer means is further configured to receive the playback data from the buffer and the record data from the input interface.

4. A system as in claim 2 further comprising digital to analog (D/A) converter coupled to receive the output data from the multiplexer; and speaker coupled to an output of the DA converter.

5. A system as in claim 1 wherein said buffer comprises a record buffer for storing the record data, and a play buffer for storing the playback data.

6. A system as in claim 1 wherein the sequence of digital media is a track of digital audio.

7. A method of playing and recording digital media, comprising the steps of:

playing a digital media sequence by transferring original data of said sequence from a mass storage element to a play buffer;

entering record mode while playing the digital media sequence, by transferring input data for the sequence to the mass storage element without halting and without substantially changing the rate of a simultaneous transfer of the original data out of the play buffer while continuing to transfer original data from the mass storage into the play buffer; and exiting record mode by halting the transfer of the input data and continuing to transfer the original data, wherein upon receiving a command to exit record mode, a next portion of the original data to be transferred out of the buffer is that which would have been transferred out had record mode not been entered.

8. A method as in claim 7 wherein the step of playing further comprises transferring the original data from the play buffer to a first input of a multiplexer.

9. A method as in claim 7 wherein the step of entering the record mode further comprises transferring the input data to a record buffer prior to transferring the input data to the mass storage element.

10. A method as in claim 8 wherein the step of playing further comprises transferring the original data from the multiplexer to an output device.

11. A method as in claim 10 wherein the step of entering record mode further comprises transferring the input data to a second input of the multiplexer and then selecting the input data and not the original data for transfer to the output device.

12. A method as in claim 11 wherein the step of exiting the record mode further comprises selecting the original data and not the input data for transfer to the output device.

13. A method as in claim 11 wherein the digital media sequence is a digital audio track.

* * * * *